Aug. 22, 1967   H. H. WIEDER ETAL   3,337,293

PROCESS FOR PREPARING THE STRONTIUM ISOMORPH OF COLEMANITE

Original Filed March 28, 1963

HARRY H. WIEDER
ARTHUR R. CLAWSON
CHARLES R. PARKERSON
INVENTORS.

BY J. M. St. Amand

ATTORNEY.

United States Patent Office

3,337,293
Patented Aug. 22, 1967

---

3,337,293
PROCESS FOR PREPARING THE STRONTIUM ISOMORPH OF COLEMANITE
Harry H. Wieder, Arthur R. Clawson, and Charles R. Parkerson, Riverside, Calif., assignors to the United States of America as represented by the Secretary of the Navy
Original application Mar. 28, 1963, Ser. No. 268,845. Divided and this application Oct. 6, 1966, Ser. No. 585,229
3 Claims. (Cl. 23—59)

The invention herein described may be manufactured and used by or for the Government of the United States of America for governmental purposes without the payment of any royalties thereon or therefor.

This is a division of U.S. patent application Ser. No. 268,845, filed Mar. 28, 1963, for Synthetic Ferroelectric Colemanite and Its Strontium Isomorph.

The present invention relates to synthetic ferroelectric colemanite and more particularly to the strontium isomorph of colemanite.

Colemanite is a mineral calcium borate pentahydrate found in relative abundance in conjunction with other borate minerals. At temperatures generally below $-2°$ C. to $-7°$ C. crystalline colemanite becomes ferroelectric and remains ferroelectric at least to $-180°$ C. Colemanite is a mechanically, electrically, and chemically stable ferroelectric material. It shows none of the polarization fatigue effects associated with barium titanate nor is it subject to deliquescence at temperatures below $+50°$ C. as some other water soluble ferroelectric materials. Mineral colemanite contains many impurities. It is difficult, therefore, to determine the dependence of the desirable electric properties upon the impurity content of a crystal. For switching applications, it is desirable to keep the transition temperature, i.e., the Curie temperature, above $+25°$ C. in order that no refrigeration be required for a computer memory device employing colemanite crystals. For its use as a dielectric bolometer or pyroelectric detector, it is desirable to control the Curie point by additive impurities so that the maximum change in polarization with temperature should occur at some predetermined temperature. Therefore, mineral colemanite because of its inhomogeneity, is not suited for these aforementioned applications and that the synthesis of the pure compound is required.

It is an object of the invention to provide the synthesis of the strontium isomorph ($2SrO \cdot 3B_2O_3 \cdot 5H_2O$) of colemanite which represents 100% replacement of calcium by strontium.

Other objects and many of the attendant advantages of this invention will become readily appreciated as the same becomes better understood by reference to the following detailed description when considered in connection with the accompanying drawings wherein.

Figure 1:
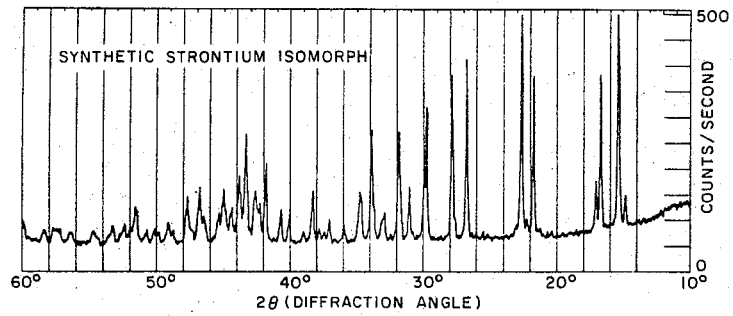
FIG. 1 shows an X-ray diffraction powder pattern of strontium isomorph of colemanite.

The publication, "Ferroelectric and Pyroelectric Properties of Mineral and Synthetic Colemanite," by H. H. Wieder, A. R. Clawson, and C. R. Parkerson, Journal of Applied Physics, 33, 1720 (1962), describes in detail the results obtained on synthetic colemanite and compares the dielectric and pyroelectric properties of the synthetic compound with the impure mineral.

Colemanite may be synthesized by a two-step reaction. The first step consists of the synthesis of inyoite $$(2CaO \cdot 3B_2O_3 \cdot 13H_2O)$$

synthetic $(2CaO \cdot 3B_2O_3 \cdot 9H_2O)$, or meyerhofferite $$(2CaO \cdot 3B_2O_3 \cdot 7H_2O)$$

For these reactions see Reactions 1, 2, and 3 of the Table of Reactions which follows. These higher hydrates may be converted to colemanite ($2CaO \cdot 3B_2O_3 \cdot 5H_2$) by reaction with borax solution. For an example of this conversion reaction see Reaction No. 4. Colemanite can also be synthesized by the preparation of gowerite $$(CaO \cdot 3B_2O_3 \cdot 5H_2O)$$

or nobleite ($CaO \cdot 3B_2O_3 \cdot 4H_2O$) as given in Reactions 5 and 7. Reaction of either of these two compounds with borax solution as given in Reactions 6 and 8 will produce colemanite.

TABLE OF REACTIONS

| Reaction No. | Reactant I | | Reactant II | | Water Amount (grams) |
|---|---|---|---|---|---|
| | Chemical Formula | Weight (grams) | Chemical Formula | Weight (grams) | |
| 1 | $Na_2B_4O_7 \cdot 10H_2O$ | 1.67 | $Ca(IO_3)_2$ | 1.94 | 100 |
| 2 | $Na_2B_4O_7 \cdot 10H_2O$ | 1.67 | $Ca(IO_3)_2$ | 1.94 | 100 |
| 3 | $(NH_4)_2B_{10}O_{16} \cdot 8H_2O$ | 1.00 | $CaCl_2$ | 0.43 | 100 |
| 4 | $Na_2B_4O_7 \cdot 10H_2O$ | 1.71 | $2CaO \cdot 3B_2O_3 \cdot 7H_2$ (−200 Mesh) | 1.00 | 100 |
| 5 | $H_3BO_3$ | 40.0 | $Ca(C_2H_3O_2)_2$ | 20.0 | 100 |
| 6 | $Na_2B_4O_7 \cdot 10H_2O$ | 2.24 | $CaO \cdot 3B_2O_3 \cdot 5H_2O$ (Gowerite) | 1.25 | 150 |
| 7 | $H_3BO_3$ | 5.29 | $2CaO \cdot 3B_2O_3 \cdot 7H_2O$ | 1.85 | 100 |
| 8 | $Na_2B_4O_7 \cdot 10H_2O$ | 2.24 | $CaO \cdot 3B_2O_3 \cdot 4H_2O$ (Nobleite) | 1.25 | 150 |
| 9 | $(NH_4)_2B_{10}O_{16} \cdot 8H_2O$ | 16.0 | $Sr(NO_3)_2$ | 7.10 | 800 |
| 10 | $Na_2B_4O_7 \cdot 10H_2O$ | 2.24 | $SrO \cdot 3B_2O_3 \cdot 4H_2O$ | 1.25 | 150 |
| 11 | $Na_2B_4O_7 \cdot 10H_2O$ | 7.60 | $Sr(NO_3)_2$ | 4.20 | 200 |
| 12 | $Na_2B_4O_7 \cdot 10H_2O$ | 4.50 | $SrO \cdot B_2O_3 \cdot 4H_2O$ (Compound VI)  | 1.50 | 150 |
| 13 | $H_3BO_3$ | 3.00 | $SrO \cdot B_2O_3 \cdot 4H_2O$ (Compound VI)  | 1.50 | 150 |
| 14 | $Na_2B_4O_7 \cdot 10H_2O$ | 2.24 | $SrO \cdot 3B_2O_3 \cdot 4H_2O$ (Compound IV) | 1.25 | 150 |
| 15 | $Na_2B_4O_7 \cdot 10H_2O$ | 4.02 | $Sr(IO_3)_2 \cdot H_2O$ | 2.55 | 150 |
| 16 | $Na_2B_4O_7 \cdot 10H_2O$ | 2.24 | $SrO \cdot 3B_2O_3 \cdot 4H_2O$ (Compound V)  | 1.25 | 150 |
| 17 | $Na_2B_4O_7 \cdot 10H_2O$ | 4.02 | $Sr(IO_3)_2 \cdot H_2O$ | 2.55 | 150 |
| 18 | $Na_2B_4O_7 \cdot 10H_2O$ | 11.44 | $SrCl_2 \cdot 6H_2O$ | 8.00 | 200 |

TABLE OF REACTIONS—Continued

| Reaction No. | Reactant III or Seed Material (if required) | | Time (days) | Temperature, °C. | Product |
|---|---|---|---|---|---|
| | Chemical Formula | Weight (grams) | | | |
| 1 | | | 34 | 30 | Inyoite ($2CaO \cdot 3B_2O_3 \cdot 13H_2O$). |
| 2 | | | 5 | 65 | Meyerhofferite ($2CaO \cdot 3B_2O_3 \cdot 7H_2O$). |
| 3 | | | 41 | 30 | Synthetic ($2CaO \cdot 3B_2O_3 \cdot 9H_2O$). |
| 4 | $2CaO \cdot 3B_2O_3 \cdot 5H_2O$ (−200 Mesh) | 0.10 | 35 | 65 | Colemanite ($2CaO \cdot 3B_2O_3 \cdot 5H_2O$). |
| 5 | | | 1 | 35 | Gowerite ($CaO \cdot 3B_2O_3 \cdot 5H_2O$). |
| 6 | $2CaO \cdot 3B_2O_3 \cdot 5H_2O$ (−200 Mesh) | 0.10 | 15 | 65 | Colemanite ($2CaO \cdot 3B_2O_3 \cdot 5H_2O$). |
| 7 | | | 8 | 85 | Nobleite ($CaO \cdot 3B_2O_3 \cdot 4H_2O$). |
| 8 | $2CaO \cdot 3B_2O_3 \cdot 5H_2O$ (−200 Mesh) | 0.10 | 19 | 65 | Colemanite ($2CaO \cdot 3B_2O_3 \cdot 5H_2O$). |
| 9 | | | 7 | 25 | Compound III ($SnO \cdot 3B_2O_3 \cdot 4H_2O$). |
| 10 | | | 13 | 65 | Compound I ($2SrO \cdot 3B_2O_3 \cdot 5H_2O$). |
| 11 | NaOH | 3.2 | 7 | 25 | Compound VI ($SrO \cdot B_2O_3 \cdot 4H_2O$). |
| 12 | | | 27 | 65 | Compound I ($2SrO \cdot 3B_2O_3 \cdot 5H_2O$). |
| 13 | | | 13 | 65 | Compound IV ($SrO \cdot 3B_2O_3 \cdot 4H_2O$). |
| 14 | | | 8 | 65 | Compound I ($2SrO \cdot 3B_2O_3 \cdot 5H_2O$). |
| 15 | NaOH | 0.80 | 5 | 65 | Compound V ($SrO \cdot B_2O_3 \cdot 4H_2O$). |
| 16 | | | 27 | 65 | Compound I ($2SrO \cdot 3B_2O_3 \cdot 5H_2O$). |
| 17 | | | 14 | 65 | Compound I ($2SrO \cdot 3B_2O_3 \cdot 5H_2O$). |
| 18 | | | 36 | 80 | Compound I ($2SrO \cdot 3B_2O_3 \cdot 5H_2O$). |

It was suspected at an earlier date (H. H. Wieder, J. Appl. Phys. 30, 1010 (1959)), that the onset of ferroelectricity in colemanite may be strongly influenced by the presence of strontium replacing calcium substitutionally in the crystal-lattice of colemanite.

Partial substitutes of strontium for calcium in colemanite is achieved by preparing the higher hydrate in the presence of the desired strontium ion impurity in the form of a highly ionized strontium compound such as $SrCl_2$, $Sr(NO_3)_2$, etc. or a partially ionized compound such as $Sr(IO_3)_2 \cdot H_2O$. The higher hydrate is then converted to colemanite with borax solution as previously described. If a higher percentage of replacement is desired, strontium ion may be added to this conversion reaction also.

The discrepancies between various authors as to the exact Curie temperature of colemanite ranging between 0° C. and −7° C. were suspected as due primarily to the variable strontium content of colemanite, i.e., that mineral colemanite is thus a solid solution of calcium-strontium borate pentahydrate. It was proposed, therefore, to produce a synthetic colemanite containing a large amount of strontium instead of calcium. The method is outlined below:

The first step consisted of the preparation of a specimen as follows (for example):

Reactants

| | | |
|---|---|---|
| $H_2O$ | ml | 800 |
| Ammonium pentaborate | gm | 16.0 |
| $Sr(NO_3)_2 \cdot H_2O$ | gm | 7.10 |

The ammonium pentaborate was dissolved in 700 ml. $H_2O$ by heating to approximately 85° C. The $Sr(NO_3)_2 \cdot H_2O$ was dissolved in 100 ml. $H_2O$ at approximately 85° C. The 100 ml. of $Sr(NO_3)_2 \cdot H_2O$ solution was added to the 700 ml. of APB while hot, a few crystal seeds of synthetic meyerhofferite was added, and the container was sealed and allowed to cool to room temperature with continuous agitation. Continuous agitation was maintained for a period of three weeks. The reaction products were then used for preparing the strontium synthetic equivalent of colemanite by the following procedure and using the indicated constituents:

| | Grams |
|---|---|
| Borax | 2.24 |
| Specimen preparation described above | 1.25 |
| $H_2O$ | 150 |

Figure 2:
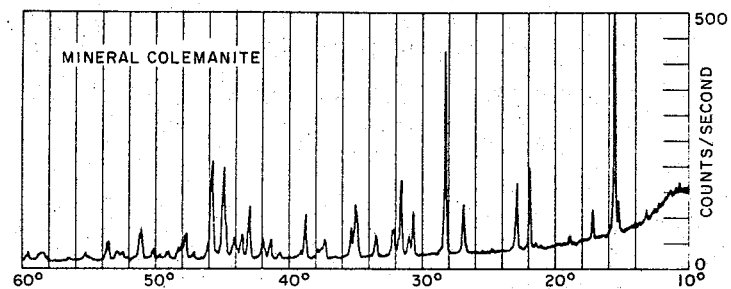
FIG. 2 shows the X-ray diffraction powder pattern of natural colemanite.

The above was heated and sealed at 70° C. and maintained at that temperature for 13 days with continuous agitation by means of a shaker table. A second sample was prepared in an identical manner except that the reaction was allowed to proceed for 35 days. The resultant crystallites are microscopic in size. The Debye-Sherer X-ray pattern, the dielectric properties and the pyroelectric properties were measured. The X-ray diffraction powder pattern of the strontium isomorph of colemanite is shown in FIG. 1. It may be compared with the powder pattern of natural colemanite shown in FIG. 2.

The X-ray powder diffraction pattern of the Sr isomorph bears a striking similarity to that of natural colemanite. The significant similarities are in the lines at the smaller angles. Since these are due to low order $hkl$ reflection there are fewer combinations of $h$, $k$, $l$ that can account for them. The similarity in the grouping of these lines indicates a very similar crystal lattice, especially since these lines occur at only slightly different angles. The change in position of the lines is due to slight changes in the interatomic distances in the lattice when Sr is substituted for Ca. The occurrence or extinction of one or two minor lines and the change in magnitude of the main reflections is also due to slight changes in position of the atoms in the lattice.

Figure 3:
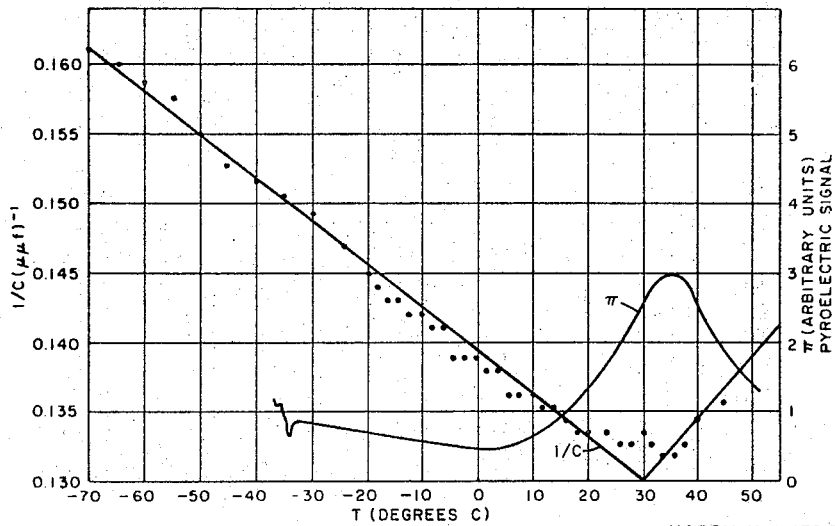
FIG. 3 shows characteristic curves for the strontium isomorph of colemanite.

In order to test the dielectric and pyroelectric properties pressed powder pellets were prepared in accordance with the description in the publication by Wieder, Clawson, and Parkerson aforementioned. FIGURE 3 (1/C curve) shows that the strontium isomorph of colemanite obeys a Curie-Weiss relation since the capacitance which may be considered as proportional to the electrical susceptibility has the typical dependence of ferroelectrics in the vicinity of their Curie temperatures. The Curie temperature of the strontium isomorph shown in FIG. 3 is +30° C. Subsequent measurements performed on other samples established the Curie temperature to be between +30° and +35° C. This is also supported by the pyroelectric data shown in FIG. 3 ($\pi$ curve) which illustrates the magnitude of the pyroelectric signal as a function of temperature obtained directly on an XY recorder. The experimental method for obtaining the pyroelectric response is also described in the publication by Wieder, Clawson, and Parkerson.

The data presented here for the colemanite strontium isomorph represent a shift of the Curie temperature from −35° C. for the pure synthetic colemanite to +35° C. The advantages of the addition of strontium and its substitution in the crystal lattice of colemanite represent a method for controlling and tailoring the properties of this material for obtaining a peak response of a pyroelectric detector at some predetermined temperature between +35° C. and −35° C. Also, the operation of ferroelectric memory elements from the strontium isomorph may be used at or near room temperature.

The strontium isomorph, Compound I $$(2SrO \cdot 3B_2O_3 \cdot 5H_2O)$$

of colemanite (100% replacement of calcium by strontium) can be synthesized by several reactions. The following related strontium borate hydrates may also be prepared as given in Table of Reactions:

Compound III (SrO·3B$_2$O$_3$·4H$_2$O), Reaction No. 9.
Compound IV (SrO·3B$_2$O$_3$·4H$_2$O), tunellite, Reaction No. 13.
Compound V (SrO·B$_2$O$_3$·4H$_2$O), Reaction No. 15.
Compound VI (SrO·B$_2$O$_3$·4H$_2$O), Reaction No. 11.

Any one of these compounds is converted to Compound I (2SrO·3B$_2$O$_3$·5H$_2$O) by the action of borax solution as described in Reactions 10, 12, 14, and 16. Compounds III and IV are dimorphous. Compounds V and VI are also dimorphous.

Compound I can also be prepared by the direct reaction of borax with a partially ionized strontium compound such as Sr(IO$_3$)$_2$·H$_2$O (see Reaction 17). Direct reaction of borax with a highly ionized strontium compound such as SrCl$_2$·6H$_2$O or Sr(NO$_3$)$_2$ produces Compound I (see Reaction 18).

Obviously many modifications and variations of the present invention are possible in the light of the above teachings. It is therefore to be understood that within the scope of the appended claims the invention may be practiced otherwise than as specifically described.

What is claimed is:
1. The synthesis of the strontium isomorph of colemanite, which represents 100% replacement of the calcium with strontium by,
    (a) reacting a compound from the group consisting of SrO·3B$_2$O$_3$·4H$_2$O and SrO·B$_2$O$_3$·4H$_2$O with approximately 1.5 to 3% borax solution at 65° C. from approximately 8 to 27 days,
    (b) filtering, washing, and drying the crystalline reaction product 2SrO·3B$_2$O$_3$·5H$_2$O.
2. The synthesis of the strontium isomorph of colemanite, which represents 100% replacement of the calcium with strontium by,
    (a) reacting Sr(IO$_3$)$_2$·H$_2$O with approximately 2.6% borax solution at 65° C. for approximately 14 days,
    (b) filtering, washing, and drying the crystalline reaction product 2SrO·3B$_2$O$_3$·5H$_2$O.
3. The synthesis of the strontium isomorph of colemanite, which represents 100% replacement of the calcium with strontium by,
    (a) reacting a compound from the group consisting of SrCl$_2$ and Sr(NO$_3$)$_2$ with approximately 5.4% borax solution 80° C. for approximately 36 days,
    (b) filtering, washing, and drying the crystalline reaction product 2SrO·3B$_2$O$_3$·5H$_2$O.

References Cited

Christ: "The American Mineralogist," vol. 45, March–April 1960, pages 334–340.

Hart et al.: "Journal of Inorganic & Narc. Chemistry," vol. 24, 1962, pages 1057–1067.

Parkerson: "U.S. Naval Ordnance Laboratory," Tech. Memo., No. 42–24, January 1959, pages 1–8.

Parkerson: "U.S. Naval Ordnance Laboratory," Tech. Memo., No. 42–31, June 1959, pages 1–8.

OSCAR R. VERTIZ, *Primary Examiner.*

H. T. CARTER, *Assistant Examiner.*